L. L. SCOTT
WORM GEAR LOCKING DEVICE.
APPLICATION FILED NOV. 15, 1918.

1,301,180.	Patented Apr. 22, 1919.

Inventor:
Lewis L. Scott

UNITED STATES PATENT OFFICE.

LEWIS L. SCOTT, OF ST. LOUIS, MISSOURI.

WORM-GEAR-LOCKING DEVICE.

1,301,180.  Specification of Letters Patent.  Patented Apr. 22, 1919.

Application filed November 15, 1918. Serial No. 262,655.

*To all whom it may concern:*

Be it known that I, LEWIS L. SCOTT, a citizen of the United States, residing at St. Louis, Missouri, have invented a certain new and useful Worm-Gear-Locking Device, of which the following is a specification.

Figure 1:
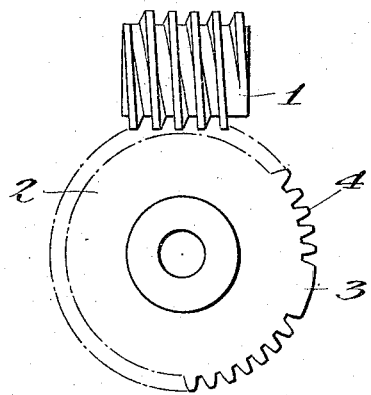
Figure 2:
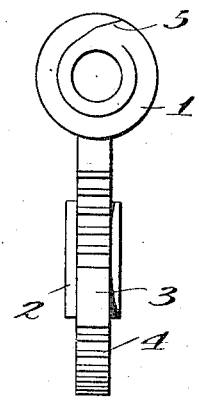

Figure 1 is a side view of the worm and worm wheel—it will be noted that only a part of the teeth in the worm wheel are shown, the balance of them being indicated by the dotted circles. Fig. 2 is an end view of Fig. 1.

The object of my invention is to provide a lock or stopping device for a worm and worm wheel which will avoid putting any end thrust on said worm when said lock or stop is engaged. In certain mechanisms where a stopping device is required, it is absolutely essential that the shaft which carries the worm have no end thrust when the stop is engaged.

In the drawings 1 indicates a worm which has a portion of the end tooth cut away and finished with a flat stop surface 5 as shown in Fig. 2. 2 is the worm wheel (in practice I use a common spur gear set at a slight angle so as to properly mesh with the worm 1), with a portion of the tooth space left solid as shown at 3. 4 indicates the teeth of the worm wheel. It will be noted, that when the portion 3 of the worm wheel moves up until the surface 5 (of the worm) strikes same, the gears will lock and prevent further rotation. It will also be noted that by this arrangement, no end thrust on the worm is possible.

What I claim is:

A worm, a worm wheel operated by said worm having a portion of its tooth space made solid so that it cannot make a complete revolution, a stop surface attached to the worm or its shaft which will contact with the solid portion of the worm wheel and lock same, when said worm wheel has moved a part of one revolution.

LEWIS L. SCOTT.

Witnesses:
ALLEN C. STALEY,
WM. BRADSHAW.

Copies of this patent may be obtained for five cents each, by addressing the "Commissioner of Patents, Washington, D. C."